United States Patent
Miletich

(10) Patent No.: US 10,583,704 B1
(45) Date of Patent: Mar. 10, 2020

(54) GOOSENECK GUIDE FOR A HITCH BALL

(71) Applicant: Richard George Miletich, Morgan Hill, CA (US)

(72) Inventor: Richard George Miletich, Morgan Hill, CA (US)

(*) Notice: Subject to any disclaimer, the term of this patent is extended or adjusted under 35 U.S.C. 154(b) by 0 days.

(21) Appl. No.: 16/558,753

(22) Filed: Sep. 3, 2019

(51) Int. Cl.
  *B60D 1/36* (2006.01)
  *B60D 1/06* (2006.01)

(52) U.S. Cl.
  CPC ............ *B60D 1/363* (2013.01); *B60D 1/065* (2013.01)

(58) Field of Classification Search
  CPC .............................. B60D 1/363; B60D 1/065
  See application file for complete search history.

(56) References Cited

U.S. PATENT DOCUMENTS

| | | | | |
|---|---|---|---|---|
| 5,114,170 A | * | 5/1992 | Lanni ..................... | B60D 1/363 280/477 |
| 5,927,742 A | * | 7/1999 | Draper ................... | B60D 1/065 280/477 |
| 6,102,422 A | * | 8/2000 | Damron ................. | B60D 1/363 280/477 |
| 6,796,573 B2 | * | 9/2004 | Beaudoin ............... | B60D 1/363 280/477 |
| 7,131,658 B2 | * | 11/2006 | MacKarvich .......... | B60D 1/065 280/477 |
| D646,209 S | * | 10/2011 | Story ..................... | B60D 1/065 D12/161 |
| 8,096,572 B1 | * | 1/2012 | Greene .................. | B60D 1/363 280/477 |
| 9,630,464 B2 | * | 4/2017 | Hochanadel ........... | B60D 1/065 |

* cited by examiner

*Primary Examiner* — Joseph M Rocca
*Assistant Examiner* — Michael R Stabley
(74) *Attorney, Agent, or Firm* — Donald R. Boys; Central Coast Patent Agency LLC

(57) ABSTRACT

A gooseneck guide has a curved mounting plate joined to a lower end of a gooseneck, presenting a V-guide to a ball mounted in a truck bed, such that a radius in the V-guide contacts the hitch ball in the truck bed as the truck is backed, guiding a latching mechanism of the gooseneck to be directly over the hitch ball as contact is made.

17 Claims, 8 Drawing Sheets

GOOSENECK GUIDE FOR A HITCH BALL

BACKGROUND OF THE INVENTION

1. Field of the Invention

The present invention is in the broad technical field of automotive apparatus and pertains more specifically to a guide for attachment to a trailer gooseneck, to facilitate positioning of a hitch ball in a truck bed to a trailer gooseneck.

2. Description of Related Art

Trailers having gooseneck apparatus for connecting to a hitch ball in a bed of a truck, such as pickup truck, are very well known in the art. There are a variety of sorts and sizes of gooseneck apparatus in the art. Some are round and some square or rectangular. Gooseneck apparatus typically have, at a lowermost extremity, a latch, operable by a short handle, for latching to a hitch ball when the gooseneck apparatus is properly positioned and lowered onto the hitch ball. the latching is automatic, precipitated by the act of engagement, and the handle is for releasing the latch when time to release the trailer.

There are also a variety of guides integrated with gooseneck apparatus in the art. To the inventor's knowledge these guides are integrated with the gooseneck apparatus in manufacture.

What the inventor provides, and what is needed in the art, is an aftermarket apparatus in a system that may be added to essentially any existing gooseneck on a trailer.

BRIEF SUMMARY OF THE INVENTION

In an embodiment of the invention gooseneck guide is provided, comprising a mounting plate having a thickness of at least one-half inch, a width greater than a width or diameter of a specific gooseneck having a vertical axis to which the gooseneck guide is to be mounted, first and second opposite, parallel lengthwise edges, the mounting plate formed to present an upper flat portion parallel to a lower flat portion, the upper and lower flat portions joined by a 180-degree curved portion having an inside radius of from 1 inch to two inches, a V-guide formed of a plate having a length, a thickness of at least one-half inch, and a width of at least one inch, the plate bent to form an included angle of at least thirty degrees having an inside radius at juncture of the V shape equal to a radius of a hitch ball to be guided within the V-guide, a cutout at an end of the upper flat portion of the mounting plate away from the curved portion, the cutout in a shape to intimately enclose one-half of the specific gooseneck, and a cutout at an end of the lower flat portion of the mounting plate away from the curved portion, the cutout formed to accept the V-guide with the V-guide opening away from the lower portion of the mounting plate. The V-guide is joined to the mounting plate such that the V-guide is presented horizontally away from the mounting plate with a center-point for the inside radius of the V-guide at the juncture of the V coinciding with the axis of the specific gooseneck, with the upper mounting plate joined intimately to the gooseneck by the cutout in the upper portion of the mounting plate.

In one embodiment the V-Guide is welded to the lower portion of the mounting plate and the cutout in the upper portion is chamfered for welding to the gooseneck. Also, in one embodiment the specific gooseneck is round and the cutout in the upper portion has a radius the same as the round gooseneck. In one embodiment the specific gooseneck is rectangular, and the cutout in the upper portion of the mounting plate is rectangular to intimately contact the rectangular gooseneck. And in one embodiment the gooseneck guide further comprises a clamp element having a shape to enclose the specific gooseneck opposite the cutout end of the upper portion of the mounting plate, and wherein the clamp element has clearance holes and the upper portion of the mounting plate has threaded holes, enabling the upper portion of the mounting plate to be securely clamped around the specific gooseneck.

In one embodiment the plate forming the V-guide has a width of at least two inches. IN one embodiment the V-guide has an included angle of at least sixty degrees but less than or equal to ninety degrees. And in one embodiment the length of each arm of the V-guide is at least six inches.

In another aspect of the invention a gooseneck guide is provided, comprising an upper plate having a thickness of at least one-half inch, a width greater than a width or diameter of a specific gooseneck having a vertical axis to which the gooseneck guide is to be mounted, first and second opposite, parallel lengthwise edges, and a first length from a first end to a second end of the upper plate, a lower plate having a thickness of at least one-half inch, the width of the upper plate, first and second opposite, parallel lengthwise edges, and a second length from a first end to a second end of the lower plate, a V-guide formed of a plate having a length, a thickness of at least one-half inch, and a width of at least one inch, the plate bent to form an included angle of at least thirty degrees having an inside radius at juncture of the V shape equal to a radius of a hitch ball to be guided within the V-guide, one or more spacers spacing the upper and lower plates apart at the second end of the upper plate and the second end of the lower plate, a cutout at the first end of the upper plate, the cutout in a shape to intimately enclose one-half of the specific gooseneck, and a cutout at the first end of the lower plate, the cutout formed to accept the V-guide with the V-guide opening away from the lower portion of the mounting plate. The V-guide is joined to the first end of the lower plate such that the V-guide is presented horizontally away from the lower plate in a direction away from the spacers, with a center-point for the inside radius of the V-guide at the juncture of the V coinciding with the axis of the specific gooseneck, with the upper mounting plate joined intimately to the gooseneck by the cutout in the upper portion of the mounting plate.

In one embodiment V-Guide is welded to the lower plate and the cutout in the upper plate is chamfered for welding to the gooseneck. Also, in one embodiment the specific gooseneck is round and the cutout in the upper plate has a radius the same as the round gooseneck. Also, in one embodiment the specific gooseneck is rectangular, and the cutout in the upper plate is rectangular to intimately contact the rectangular gooseneck. In one embodiment the gooseneck guide further comprises a clamp element having a shape to enclose the specific gooseneck opposite the cutout end of the upper plate, and wherein the clamp element has clearance holes and the upper plate has threaded holes, enabling the upper portion of the mounting plate to be securely clamped around the specific gooseneck. In one embodiment the plate forming the V-guide has a width of at least two inches. In one embodiment the V-guide has an included angle of at least sixty degrees but less than or equal to ninety degrees. In one embodiment the length of each arm of the V-guide is at least six inches. And in one embodiment the gooseneck guide further comprises side plates joined by fasteners to edges of the upper and the lower plates, the side plates strengthening the assembled structure.

DETAILED DESCRIPTION OF THE INVENTION

Figure 1:
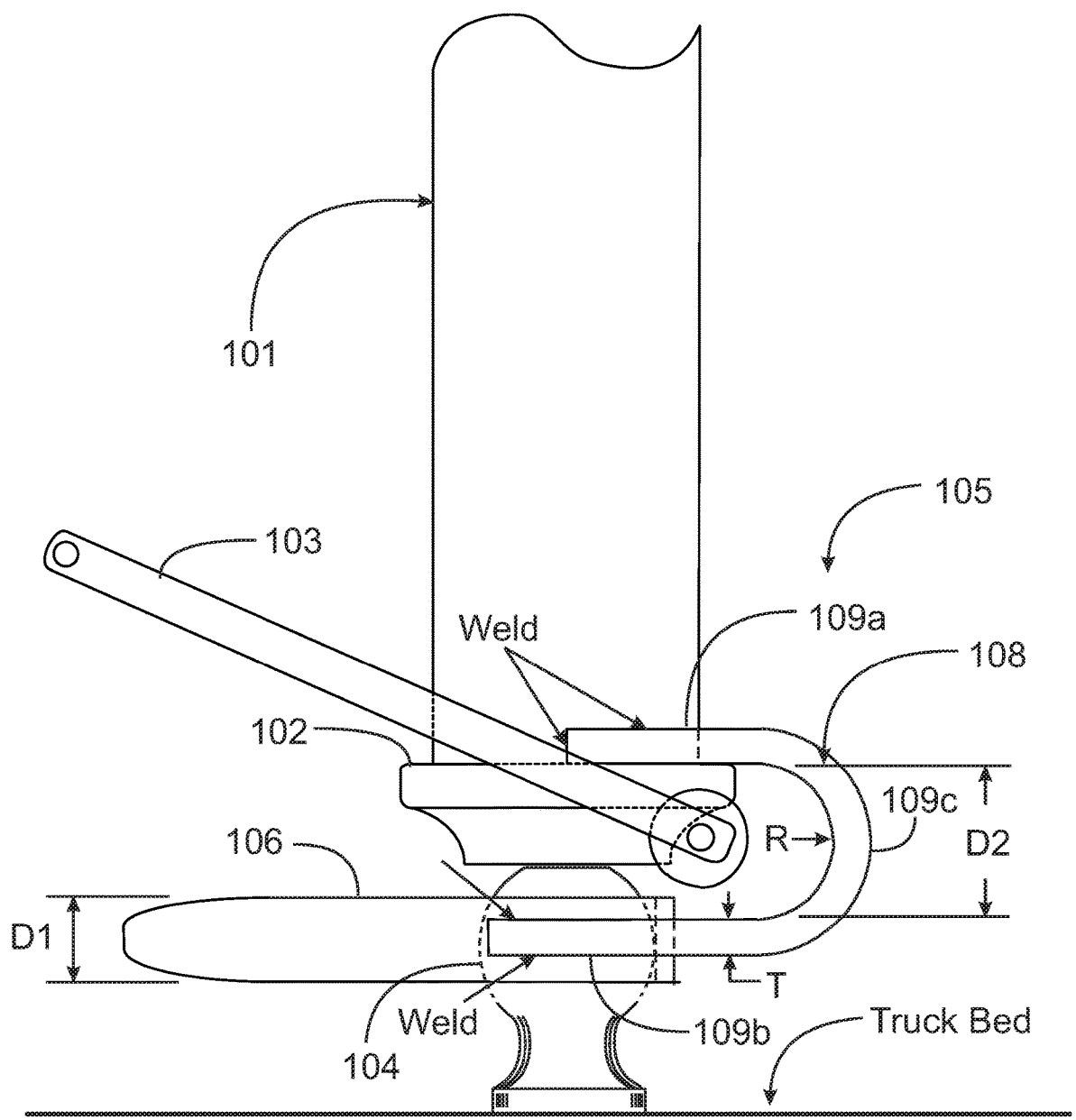
FIG. 1 is a side elevation view of a hitch ball in a bed of a truck, and a gooseneck guide in an embodiment of the invention.

FIG. 1 is a side elevation view of a hitch ball 104 mounted in a bed of a truck, and a gooseneck guide 105 welded or otherwise attached to a gooseneck 101 having a latch mechanism 102 with a latch handle 103, in an embodiment of the invention. Gooseneck 101 may be round and of one of different diameters in this embodiment, or may be square or rectangular, and latch mechanism 102 may be one of several different models. It may be seen that guide 105 consists of a plate element 108, that may be formed to the necessary curvature, and a V-guide element 106 which is welded to the plate element 108. Plate 108 is formed to have an upper flat portion 109*a*, a lower flat portion 109*b* parallel to the upper portion 109*a*, and a 180-degree curved portion 109*c*.

In this example height dimension D1 of V-guide element 106 is about 2.0 inches but may vary somewhat in different embodiments. Thickness T of plate element 108 may vary from about ½ inch to as much as 1 inch or slightly more. Dimension D2 is about 2.5 inches, but this height dimension may vary in different embodiments as well, as this dimension determines the height of V-guide 106 relative to the hitch ball 104 as alignment to connect is accomplished. With D2 at about 2.5 inches, R is about 1.25 inches. These dimensions will vary in other embodiments of the invention, in part depending on the nature of the latch mechanism, the hitch ball used, and possibly other circumstances as well. Ball 104 has a flat top, and in this example the supported height of gooseneck 101 is just to clear the top of the ball as a truck is backed to present the hitch ball below the gooseneck.

Figure 2:
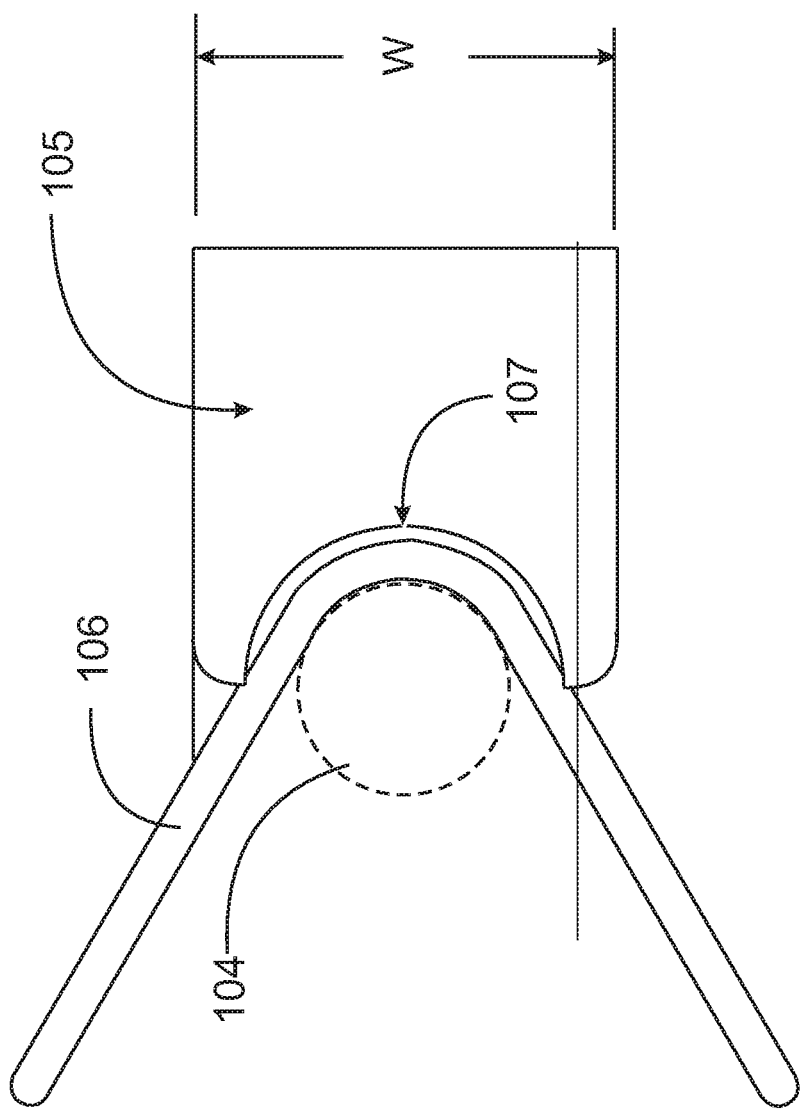
FIG. 2 is a plan view of elements of FIG. 1 in an embodiment of the invention.

FIG. 2 is a plan view from above without the gooseneck, showing the shape of the upper part of plate element 108 and a portion of a lower part of the plate element. The upper portion is seen to have a cutout at 107, which is compatible with the diameter of the gooseneck. This may vary according to the gooseneck if round and may have a rectangular shape of the gooseneck itself is square or rectangular. An important purpose of the cutout is to fit intimately to the gooseneck, so the guide may be securely welded to the gooseneck just above the added latch mechanism. The lower portion of mounting plate 108 is shaped to weld to V-guide 106 at about a center height of the V-guide.

Dimension W in FIG. 2 may vary, in part depending on the shape and size of the gooseneck. In this example the gooseneck is round, and the diameter may be 4.5 inches, in which circumstance W will be about 5.5 inches.

Figure 3:
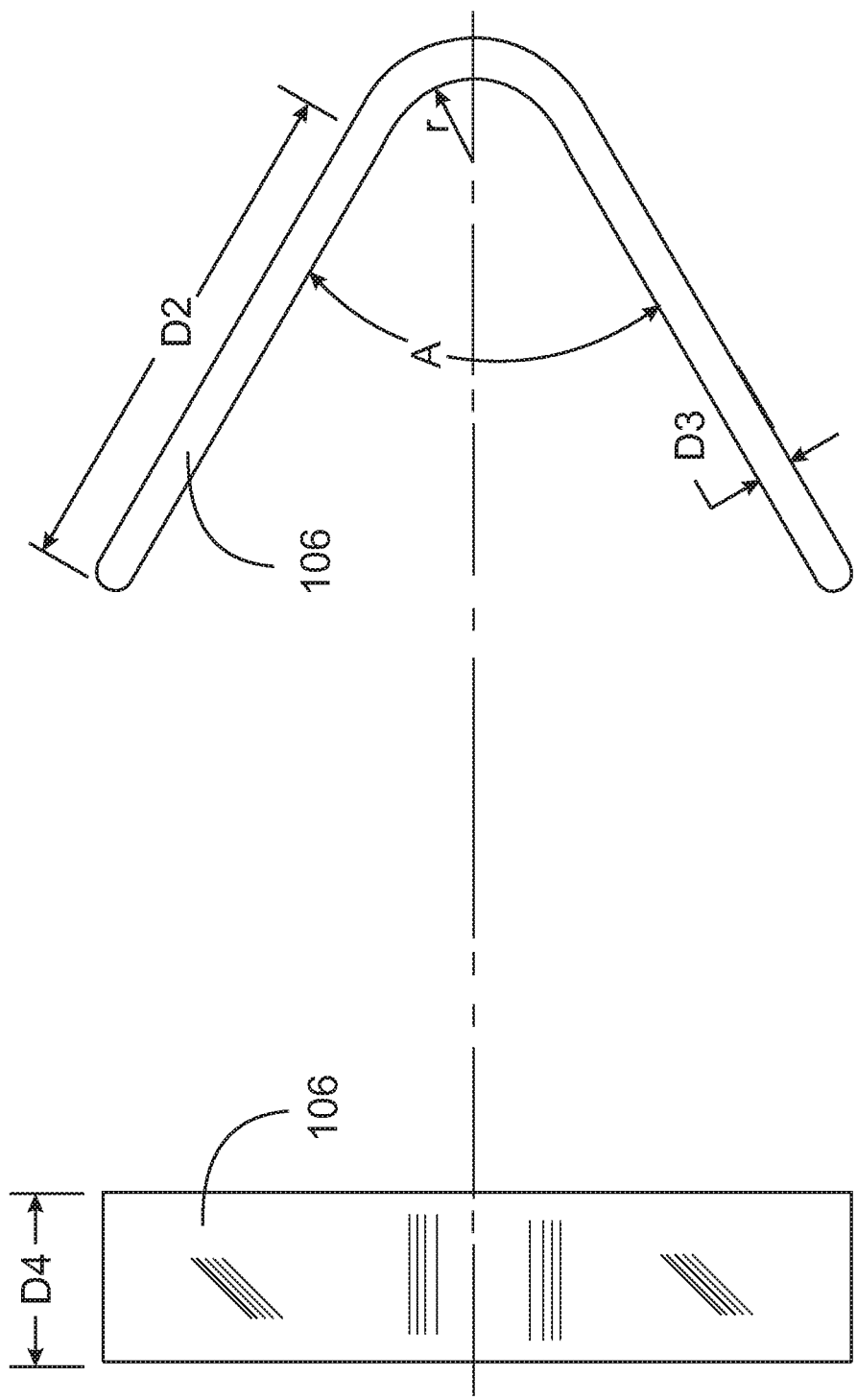
FIG. 3A is an edge view of a V-guide of the gooseneck guide of FIGS. 1 and 2.
FIG. 3B is a plan view of the V-guide of FIG. 3A.

FIG. 3A is an edge view of V-guide 106 of the gooseneck guide of FIGS. 1 and 2, and FIG. 3B is a plan view of the V-guide. D1 in this example is about 2.0 inches but may be different in other embodiments. A greater D1 allows more leeway in support height of the trailer from which the gooseneck descends, to still properly guide the hitch ball in the truck bed into the guide, and to position properly below the gooseneck latch. The greater height, however, may make height adjustment to the truck bed more difficult.

FIG. 3B, the plan view, shows the side arms of the V-guide with a length denoted D3, which may vary in different embodiments, but will vary between at least four inches and as much as six inches or more in various embodiments. Thickness D4 may be about one-half to five-eighths inches or more, for adequate strength to withstand the forces in positioning and connection. In FIG. 3G radius r is to be the radius of the hitch ball, which in one example is 2 and 5-sixteenths inches. in which case r will be about 1.156 inches. This dimension is important, because, as the pickup is backed and the hitch ball encounters one side or the other of the V-guide 106, the truck is urged to one side or the other, and when the hitch ball encounters the end of the V-guide at radius r, there is a very noticeable solid encounter that signals the driver that position is established, and to set the brake.

V-guide 106 forms a V shape having an included angle of at least 30 degrees, and in some embodiments as much as ninety degrees or more. The included angle and the length of the sides of the V together present a target of a specific width for the ball in the bed of a truck as a user backs the truck to engage the ball in the V-guide. Included angle and length of sides of the V-guide will vary in different embodiments depending at least in part on preference of a user.

Figure 4:
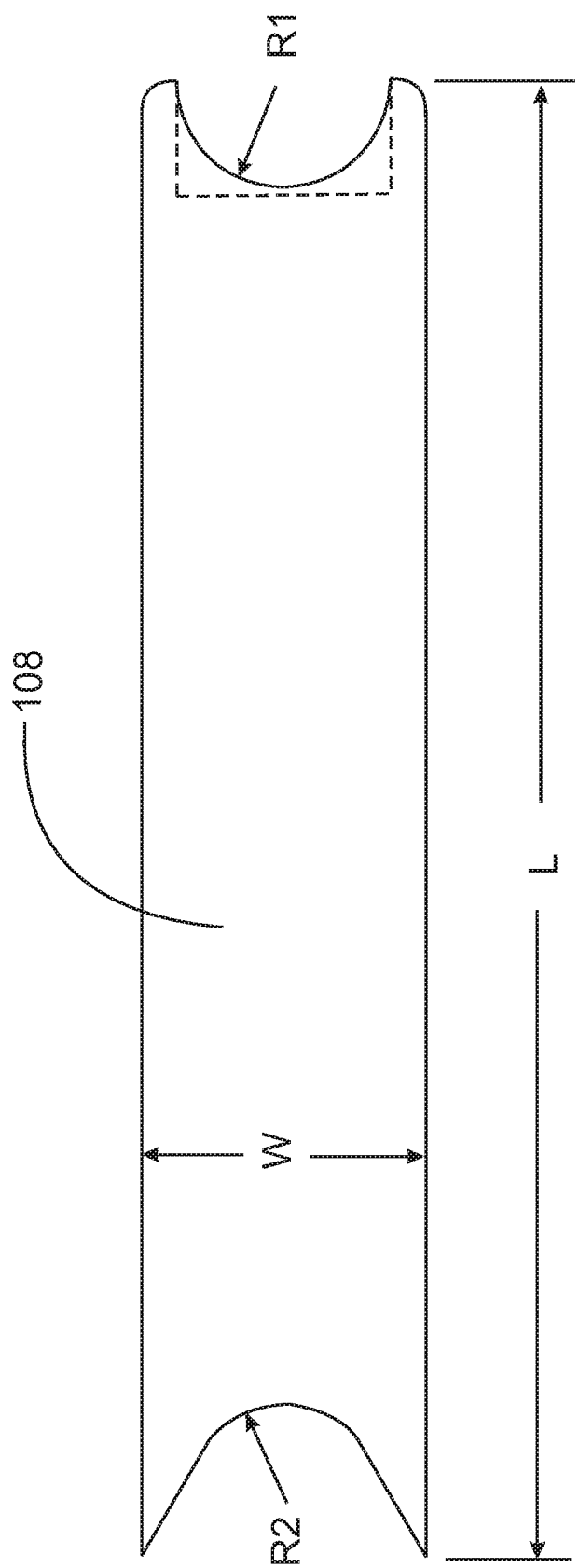
FIG. 4 is a plan view of plate element of FIG. 2, straightened, in an embodiment of the invention.

FIG. 4 is a plan view of plate element 108 of FIG. 2, straightened out, without the 180-degree bend of the finished product, to show the layout of the plate before bend formation. Given the probable dimensions above for the elements of the assembled and welded gooseneck guide in one example, the overall length of plate element 108 prior to forming may be about eighteen inches. The overall width W of the plate element may be as stated above in one example about 5.50 inches. R1 is a radius compatible with the diameter of a round gooseneck in one example. Dotted line 110 indicates a possible cutout to accommodate a square gooseneck, in which case the overall length may be greater, because the square shape may be extended to weld to a full width of the gooseneck, making a stronger assembly.

The skilled person will understand that the dimensions and the shape shown in FIG. 4 is with underlying assumptions as the gooseneck style and dimensions and height variations. The thickness of plate 108 in the example described above is meant to be from one-half to five-eighths of an inch. In some embodiments this may be as much as one inch or more. In some embodiments the radii may vary due to different ball diameters and different gooseneck styles.

The inventors are aware that a product based on this invention may be sold as a formed and welded unit that has bend R as shown in FIG. 1, and with V-guide 106 welded to the formed plate element, Welding or otherwise attaching the welded unit to the gooseneck, however, will require welding or machining and assembly to the gooseneck of the customer or client. In some circumstances the unit might be sold and shipped as flat plates which the purchaser would form and weld and assemble to the purchaser's gooseneck. But the inventors are also aware that likely only a minority portion of potential customers may have the equipment and experience to do the forming and assembly. Welding or otherwise attaching unit 105 to a gooseneck, however, is a relatively simple operation, and straightforward for most welding shops, which should be available in just about any geographic location in the US, or around the world for that matter. Therefore, in one circumstance, formed and welded units 105 would likely be sold and shipped to purchasers, who would contract to finish the job with a local contractor.

To provide an assembled unit 105 for a potential client will require foreknowledge of the nature of both the client's gooseneck, and of the client's hitch ball diameter and height from the truck bed. In one process the inventors may provide formed units of differing radius or square cut-out on the mounting end to the gooseneck to retail outlets, who may, as a part of the point-of-sale process, select the appropriate assembly of which there may be three or four variations, to provide to the client, along with a recommendation of a local contractor to finish assembly to the client's gooseneck.

In another process, promotional material may be provided to retail outlets, such as auto parts stores and truck product outlets in the retail arena, illustrating advantages of the system for potential clients, and the retail outlet may provide either a hardcopy form or a digital form, such as for a computer or smart phone, whereby the potential client may provide his or her details as to nature of gooseneck, latch mechanism, and hitch ball details, which may then be communicated to an enterprise licensed to practice the invention, who will make the proper selections, and do the forming and welding, and then send the finished product directly to the client, or to the retail outlet who may share in the revenue generated.

In another circumstance a very similar process may solicit the client to ship or deliver his or her gooseneck to the shop, who will assemble the entire unit and provide same back to the client. This latter process has a distinct advantage in that the only requirement for the client is to remove the gooseneck from the trailer and reassemble it to the trailer when it comes back with the gooseneck guide 105 assembled.

The point of sale processes described just above may provide a new process for retail outlets in situations where provision of products requires detailed foreknowledge of a customer's equipment to provide a proper finished product that will integrate with the customer's equipment in general.

Figure 5:
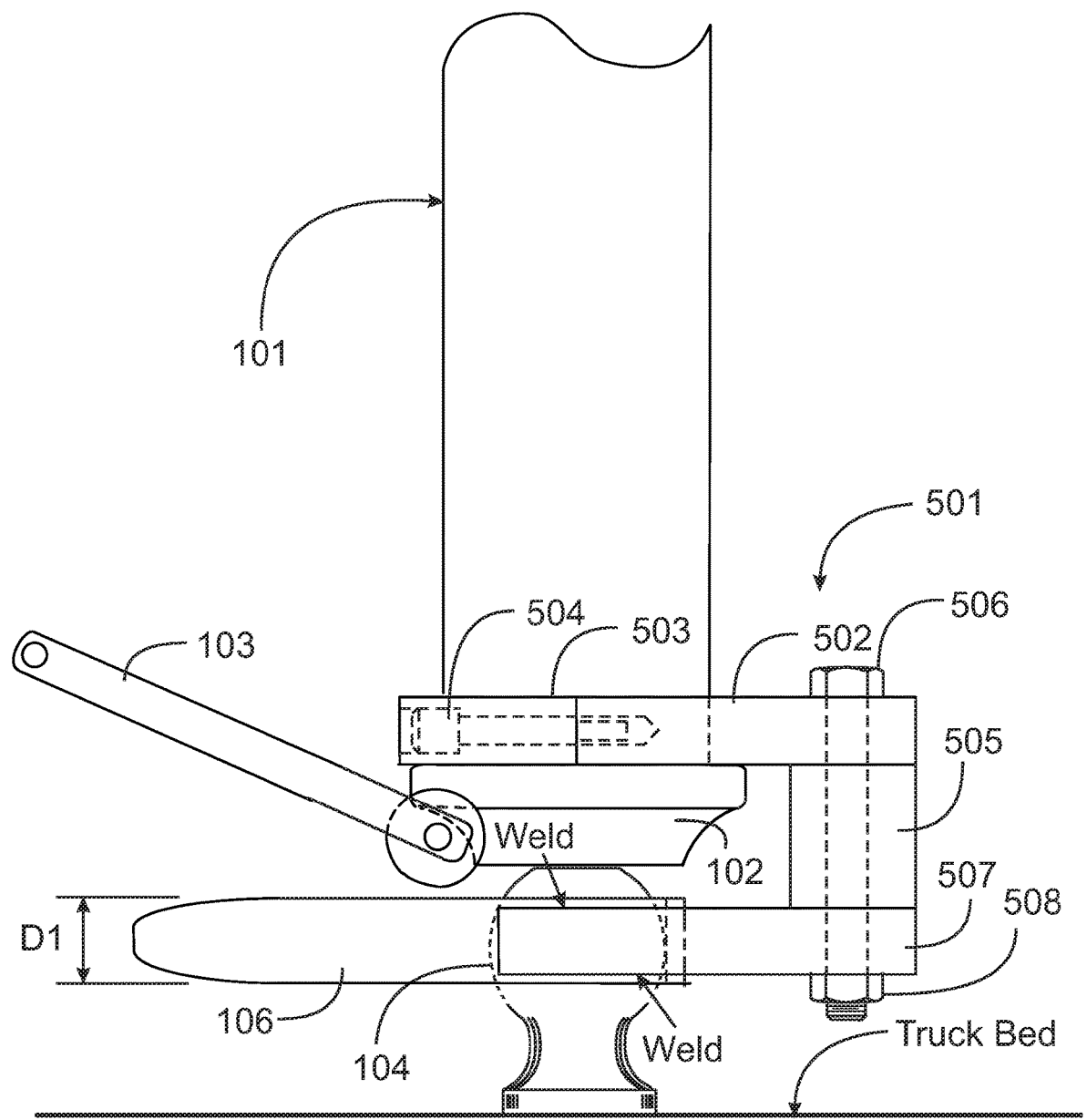
FIG. 5 is an elevation view of a gooseneck guide in an alternative embodiment of the invention.

FIG. 5 illustrates an alternative embodiment of the invention in which welding, forming or machining by the end user is not required. In FIG. 5 the latch assembly 102 has been assembled to the gooseneck 101 such that the shaft for manipulating the latch is on the front of the assembly, as shown, and the latch handle extends to the front, as shown. This may not be possible in all assemblies but has a distinct advantage where it may be done. In this example gooseneck guide 501 has a clamp structure comprising two plate pieces 502 and 503 joined around gooseneck 101 using two large socket-head screws 504. A lower structure comprising a plate 507 welded to a V-guide 106 is spaced below plate 502 by a spacing plate 505. In this example, plates 502 and 507, with spacer 505 are joined by through hex bolts 506 and hex nuts 508. In some embodiments plate 507 may be counter-bored so that hex nuts 508 may be in the counter-bore, to preserve clearance to the truck bed.

Figure 6:
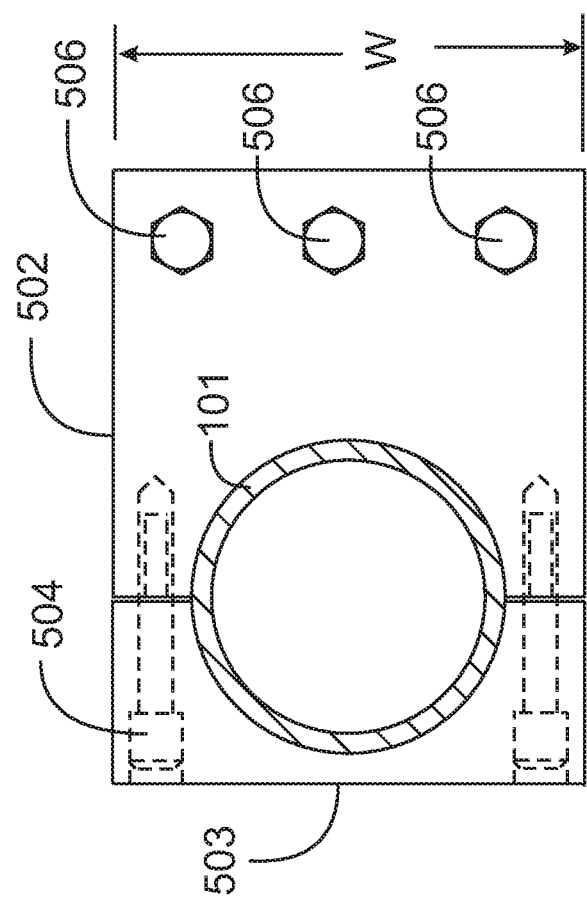
FIG. 6 is a plan view of a clamp assembly of FIG. 5 in an embodiment of the invention.

FIG. 6 is a plan view of just the clamp assembly of plates 502 and 503 around gooseneck 101. Plate 503 is drilled to clear socket head screws 504, and plate 502 is drilled and threaded to engage screws 504. The plates are prepared with a small gap between to allow for substantial tension to be applied by the screws in assembly. Three hex head bolts 506 are shown positioned along the right edge of plate 502, to hold plates 502 and 507 together through spacer 505 seen in FIG. 5.

Figure 7:
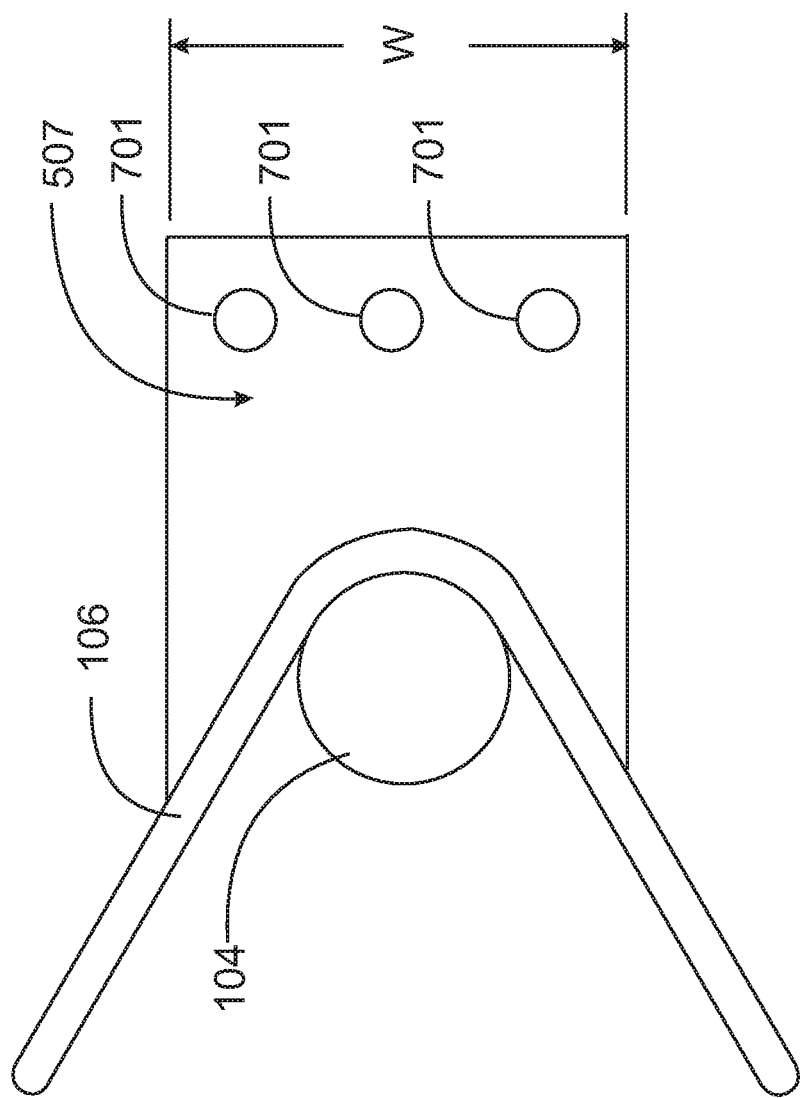
FIG. 7 is a plan view of a plate and V-guide of FIG. 5 in an embodiment of the invention.

FIG. 7 is a plan view of plate 507 welded to V-guide 106, illustrating the positions of hitch ball 104 in position to latch, and holes 701 positioned for hex head screws 506 as well.

Figure 8:
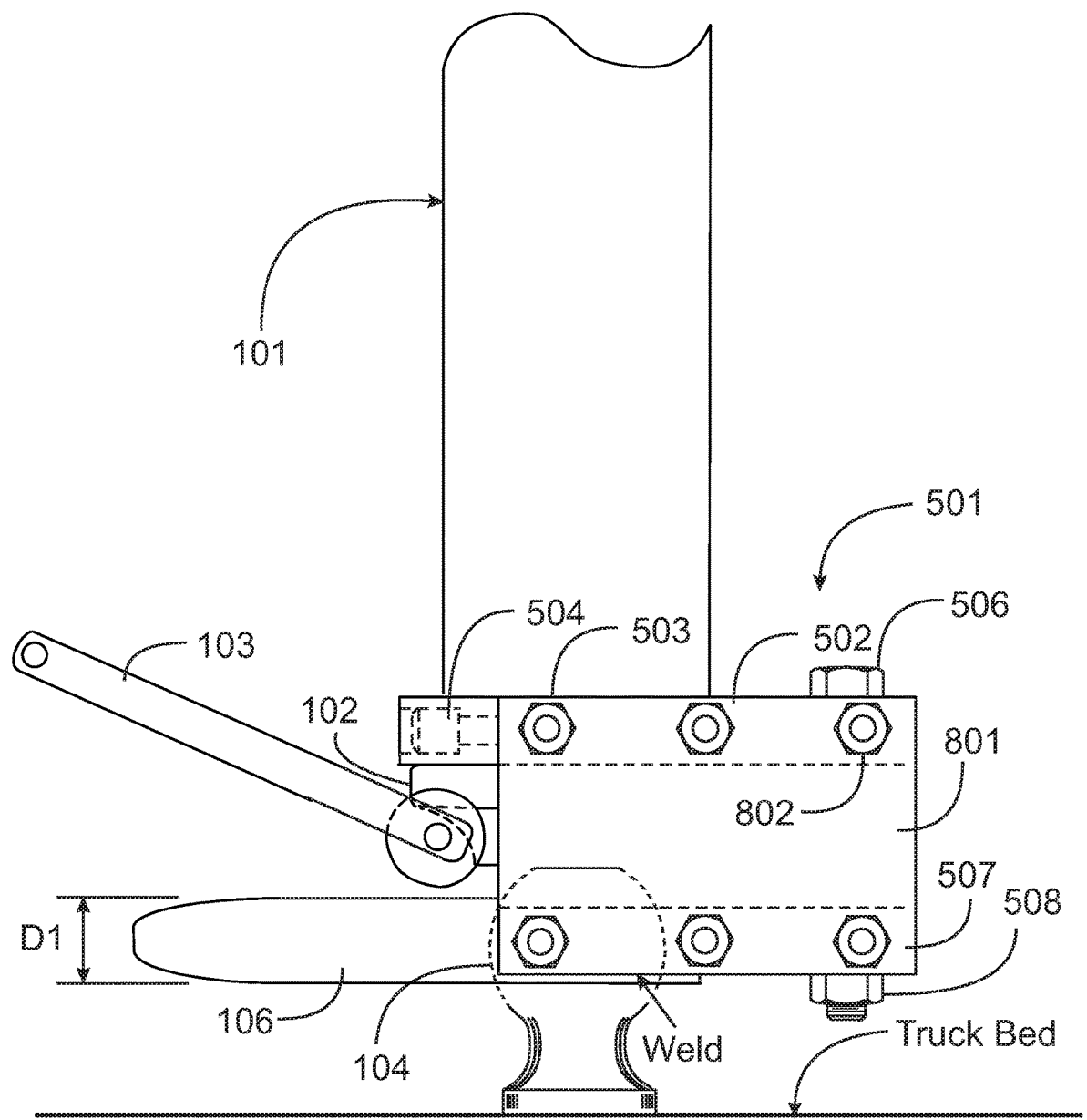
FIG. 8 is an elevation view of the gooseneck guide of FIG. 5 with additional elements in an embodiment of the invention.

FIG. 8 is an elevation view of the gooseneck guide of FIG. 5 in an alternative embodiment. In the assembly of FIG. 8 the latch mechanism 102 is assembled to the gooseneck in a manner that the horizontal shaft to which the latch release handle is engaged is on the forward side of the gooseneck and handle 103 projects forward. This allows two distinct advantages. Firstly, referring back to FIG. 5, plates 502 and 507 may be shorter, and spacer 505 may be considerably closer to the edge of the latch mechanism on the back side, which makes the assembly stronger. Secondly, now reinforcing plates 801 of perhaps one-half inch thickness may be added to both sides of the assembly (one is shown) with hex-head screws 802 engaging threaded holes in the sides of both plates 502 and 507. This also makes the assembly considerably stronger.

The embodiments of FIGS. 5 and 8 provide a gooseneck guide that may be packaged as a few parts and offered at point-of-sale in a retail establishment without the customer having to have any machining or welding done after the purchase. plates 502 and 503 that comprise the clamp for engaging the gooseneck will vary for the customer, depending on the nature of the customer's gooseneck, but all of the other parts may be common.

The skilled person will understand that the various embodiments illustrated and described herein are exemplary, and not limiting. There may well be a variety of variations in parts and assembly that are not explicitly described, but that still fall well within the scope of the invention. The invention is limited only by the claims.

I claim:

1. A gooseneck guide, comprising:
   a mounting plate having a thickness of at least one-half inch, a width greater than a width or diameter of a specific gooseneck having a vertical axis to which the gooseneck guide is to be mounted, first and second opposite, parallel lengthwise edges, the mounting plate formed to present an upper flat portion parallel to a lower flat portion, the upper and lower flat portions joined by a 180-degree curved portion having an inside radius of from 1 inch to two inches;
   a V-guide formed of a plate having a length, a thickness of at least one-half inch, and a width of at least one inch, the plate bent to form an included angle of at least thirty degrees having an inside radius at juncture of the V shape equal to a radius of a hitch ball to be guided within the V-guide;
   a cutout at an end of the upper flat portion of the mounting plate away from the curved portion, the cutout in a shape to intimately enclose one-half of the specific gooseneck; and
   a cutout at an end of the lower flat portion of the mounting plate away from the curved portion, the cutout formed to accept the V-guide with the V-guide opening away from the lower portion of the mounting plate;

wherein the V-guide is joined to the mounting plate such that the V-guide is presented horizontally away from the mounting plate with a center-point for the inside radius of the V-guide at the juncture of the V coinciding with the axis of the specific gooseneck, with the upper mounting plate joined intimately to the gooseneck by the cutout in the upper portion of the mounting plate.

2. The gooseneck guide of claim 1 wherein the V-Guide is welded to the lower portion of the mounting plate and the cutout in the upper portion is chamfered for welding to the gooseneck.

3. The gooseneck guide of claim 1 wherein the specific gooseneck is round and the cutout in the upper portion has a radius the same as the round gooseneck.

4. The gooseneck guide of claim 1 wherein the specific gooseneck is rectangular, and the cutout in the upper portion of the mounting plate is rectangular to intimately contact the rectangular gooseneck.

5. The gooseneck guide of claim 1 further comprising a clamp element having a shape to enclose the specific gooseneck opposite the cutout end of the upper portion of the mounting plate, and wherein the clamp element has clearance holes and the upper portion of the mounting plate has threaded holes, enabling the upper portion of the mounting plate to be securely clamped around the specific gooseneck.

6. The gooseneck guide of claim 1 wherein the plate forming the V-guide has a width of at least two inches.

7. The gooseneck guide of claim 1 wherein the V-guide has an included angle of at least sixty degrees but less than or equal to ninety degrees.

8. The gooseneck guide of claim 1 wherein the length of each arm of the V-guide is at least six inches.

9. A gooseneck guide, comprising:

an upper plate having a thickness of at least one-half inch, a width greater than a width or diameter of a specific gooseneck having a vertical axis to which the gooseneck guide is to be mounted, first and second opposite, parallel lengthwise edges, and a first length from a first end to a second end of the upper plate;

a lower plate having a thickness of at least one-half inch, the width of the upper plate, first and second opposite, parallel lengthwise edges, and a second length from a first end to a second end of the lower plate;

a V-guide formed of a plate having a length, a thickness of at least one-half inch, and a width of at least one inch, the plate bent to form an included angle of at least thirty degrees having an inside radius at juncture of the V shape equal to a radius of a hitch ball to be guided within the V-guide;

one or more spacers spacing the upper and lower plates apart at the second end of the upper plate and the second end of the lower plate;

a cutout at the first end of the upper plate, the cutout in a shape to intimately enclose one-half of the specific gooseneck; and a cutout at the first end of the lower plate, the cutout formed to accept the V-guide with the V-guide opening away from the lower portion of the mounting plate;

wherein the V-guide is joined to the first end of the lower plate such that the V-guide is presented horizontally away from the lower plate in a direction away from the spacers, with a center-point for the inside radius of the V-guide at the juncture of the V coinciding with the axis of the specific gooseneck, with the upper mounting plate joined intimately to the gooseneck by the cutout in the upper portion of the mounting plate.

10. The gooseneck guide of claim 9 wherein the V-Guide is welded to the lower plate and the cutout in the upper plate is chamfered for welding to the gooseneck.

11. The gooseneck of claim 9 wherein the specific gooseneck is round and the cutout in the upper plate has a radius the same as the round gooseneck.

12. The gooseneck guide of claim 9 wherein the specific gooseneck is rectangular, and the cutout in the upper plate is rectangular to intimately contact the rectangular gooseneck.

13. The gooseneck guide of claim 9 further comprising a clamp element having a shape to enclose the specific gooseneck opposite the cutout end of the upper plate, and wherein the clamp element has clearance holes and the upper plate has threaded holes, enabling the upper portion of the mounting plate to be securely clamped around the specific gooseneck.

14. The gooseneck guide of claim 9 wherein the plate forming the V-guide has a width of at least two inches.

15. The gooseneck guide of claim 9 wherein the V-guide has an included angle of at least sixty degrees but less than or equal to ninety degrees.

16. The gooseneck guide of claim 9 wherein the length of each arm of the V-guide is at least six inches.

17. The gooseneck guide of claim 9 further comprising side plates joined by fasteners to edges of the upper and the lower plates, the side plates strengthening the assembled structure.

* * * * *